Dec. 14, 1954     E. W. JOHNSON ET AL     2,696,937
METHOD OF FILLING THERMOSTAT TUBES
Filed Nov. 19, 1948                      2 Sheets-Sheet 1
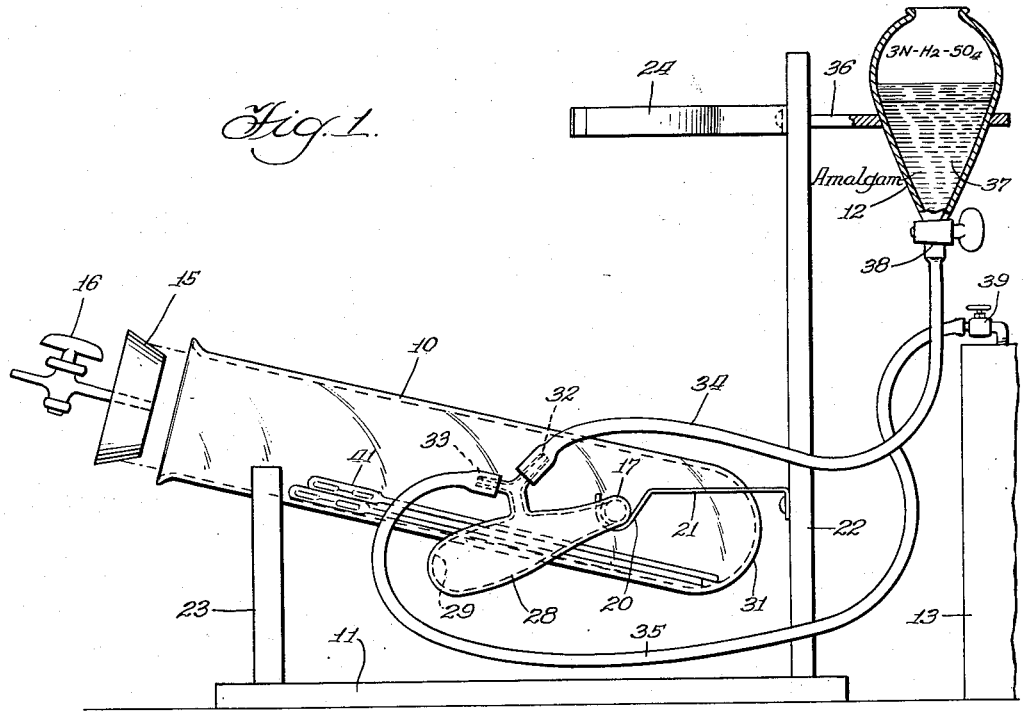
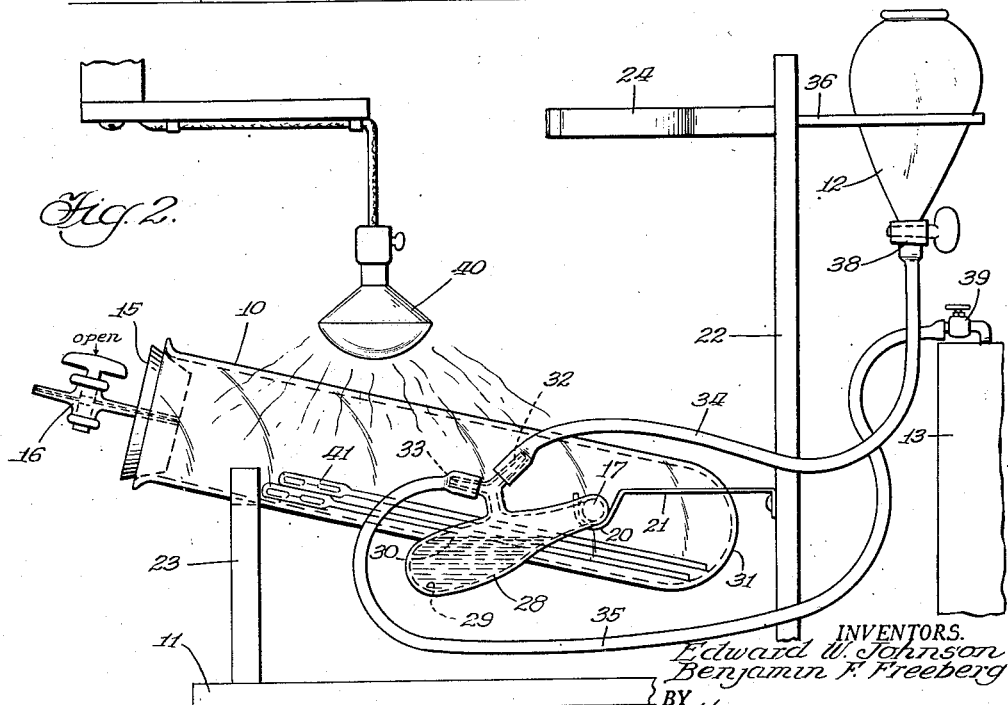
INVENTORS.
Edward W. Johnson
Benjamin F. Freeberg
BY Harvey M. Gillespie
Atty.

Dec. 14, 1954  E. W. JOHNSON ET AL  2,696,937
METHOD OF FILLING THERMOSTAT TUBES
Filed Nov. 19, 1948  2 Sheets-Sheet 2
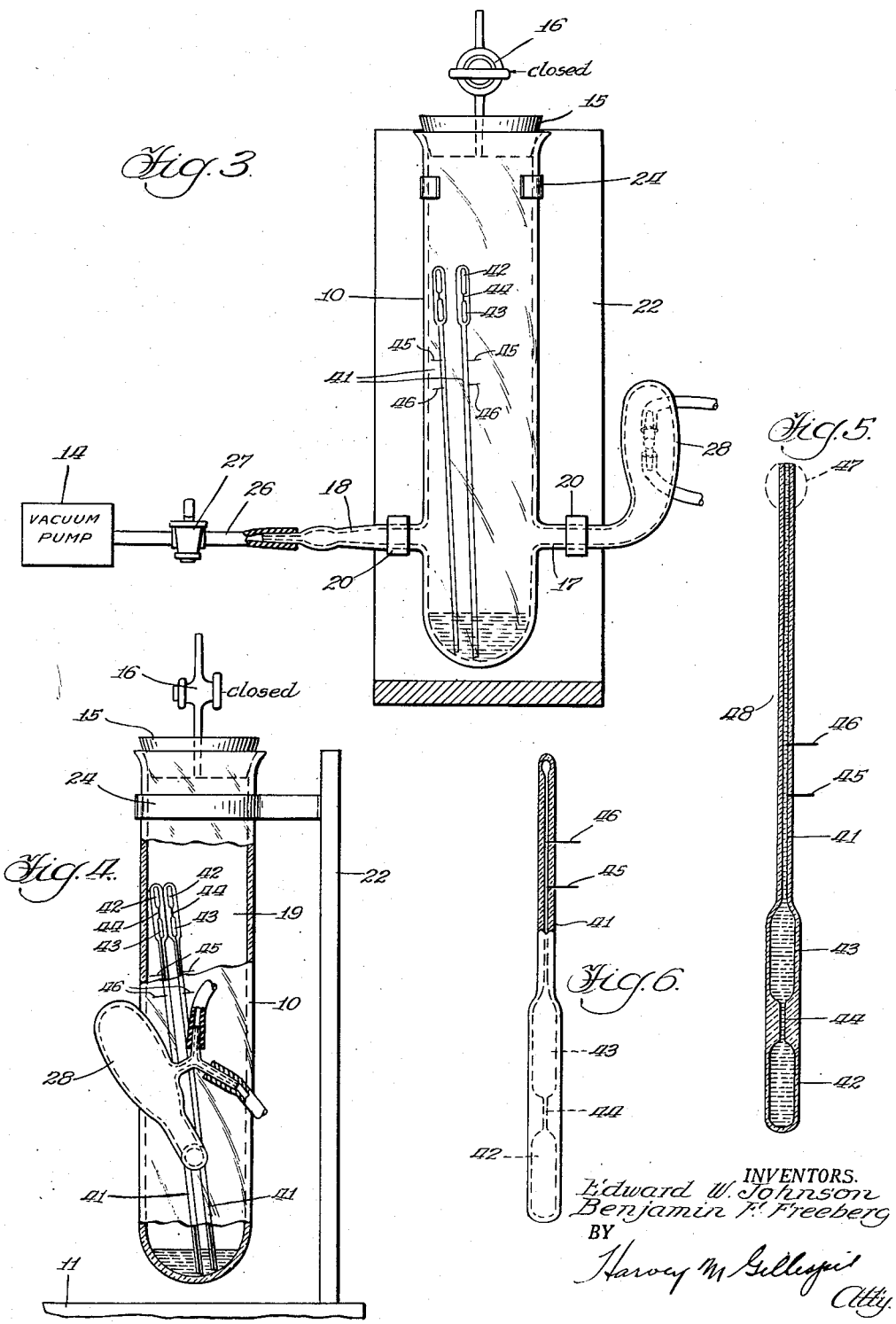
INVENTORS.
Edward W. Johnson
Benjamin F. Freeberg
BY
Harvey M. Gillespie
Atty.

United States Patent Office 2,696,937
Patented Dec. 14, 1954

2,696,937

METHOD OF FILLING THERMOSTAT TUBES

Edward W. Johnson and Benjamin F. Freeberg, Chicago, Ill., assignors to Vapor Heating Corporation, Chicago, Ill., a corporation of Delaware Application November 19, 1948, Serial No. 60,866

4 Claims. (Cl. 226—21)

This invention relates to the manufacture of thermostats of the general class in which a column of temperature sensing liquid is contained in a glass tube.

A principal object of the invention is to provide an improved method of filling thermostat tubes with a temperature sensing liquid of a highly oxidizable character; the method being comprised of a series of steps whereby a number of thermostat tubes may be filled simultaneously and whereby the temperature sensing liquid is maintained wholly isolated from the atmosphere and other oxidizing agents during the tube filling operation.

The temperature sensing columns, for the thermostats of the above general class, have ordinarily been composed of mercury, since this metallic liquid is a good electrical conductor and possesses other qualities which makes it suitable for use. However, the mercury column thermostat is not entirely satisfactory for use in many situations, since the freezing point of mercury (minus 38.02° Fahrenheit) makes it necessary, when the thermostat is used in temperatures below the freezing point of mercury, to provide means for applying fixed amounts of auxiliary heat to the thermostat tube. This practice is not entirely satisfactory, since it is difficult to accurately control the amount of heat supplied for different temperatures being measured.

In order to overcome the above disadvantage of mercury column thermostats, a thallium amalgam containing 8.73% of thallium, by weight, has been developed. While this amalgam has a freezing point of minus 74.20° Fahrenheit as compared with (38.02°) Fahrenheit, the freezing point of mercury, the amalgam presents other objections. However, its principal objection appears to be its highly oxidizable character. It is necessary, because of its oxidizable character, to keep the thallium isolated from the atmosphere. The oxidation is particularly objectionable in the amalgam, since the mercury content of the amalgam loosens any oxide coating on the thallium and, therefore, re-exposes the thallium to the atmosphere and further oxidation.

If a thermostat tube is charged with thallium amalgam containing thallium oxide, the tube soon develops an inner coating of oxide, which not only causes the amalgam to stick in the thermostat tube, but also, by coating of the contacts, interferes with the electrical control function of the thermostat. Furthermore, the errors produced may vary at different times in the same thermostat. Consequently, it is important that the amalgam be entirely clear of all oxide before it is sealed in the thermostat tube.

It is, therefore, a specific object of the present invention to provide a simplified method of filling thermostat tubes with thallium amalgam, whereby the said amalgam is thoroughly isolated from all oxidizing agents, and whereby all moisture is excluded from the tubes and from the vessel containing the tubes for filling, so that the thallium will remain free of any reaction incident to the presence of air or moisture.

According to the present method, the thallium amalgam, after being thoroughly refined and washed by passing it through anhydrous methyl alcohol to remove all water from the amalgam and by passing it through the washing liquid, for example a dilute solution of sulphuric acid (approximately 15%), the purified amalgam is stored in a suitable container under a blanket of dilute sulphuric acid so that it will be ready for use.

The thermostat tubes to be filled are formed at one end with one or more bulbs for containing the temperature sensing amalgam and are provided with suitably spaced contact wires leading into the bore of the tube. The tube blanks are also somewhat longer than the finished product and are open only at their upper ends.

The first step of the improved method may be described as the placing of a number of the tube blanks in a vessel, wherein the tubes are treated to remove all atmosphere and moisture therefrom. The said tubes are inserted in the vessel with their open ends arranged near the bottom of the vessel and the vessel, while it is open, is thoroughly flushed with nitrogen so as to remove as much of the atmosphere as is possible without the use of vacuum.

After the vessel and the tubes therein are thoroughly flushed with nitrogen, and during the continuance of this flushing operation, a quantity of thallium amalgam is delivered into the vessel. The said amalgam is preferably maintained in an auxiliary chamber or in a portion of the main chamber so that it will not, at this time, seal the open ends of the thermostat tubes. Vacuum is now drawn on the vessel to withdraw the nitrogen therefrom. During this step of the method, heat is applied to the exterior of the vessel so as to vaporize and drive off all moisture contained in the vessel and the tubes. When the vessel is thoroughly evacuated, the thallium amalgam in the vessel is caused to flow into a position in the vessel to immerse the open ends of the tubes. This result may be accomplished by changing the position of the vessel so that the tubes will stand in a vertical position with their open ends extending into the body of amalgam. Nitrogen is again delivered into the vessel to establish an internal pressure therein equal to the internal atmospheric pressure, whereby the pressure differential on the outside and the inside of the tubes, causes the thallium amalgan to flow into and completely fill all of the tubes in the treating vessel.

After the tubes are filled with the amalgam, the vessel, while being continuously flushed with nitrogen, is opened and the tubes are individually removed therefrom. The ends of the tubes are immediately heated to a fusing temperature and pinched together so as to thoroughly seal the tube. After sealing the end of the tube, the application of heat thereto is continued until the glass becomes somewhat plastic, whereupon internal vapor pressure is developed to expand the molten glass and thereby form an auxiliary bulb at the upper end of the tube.

After the auxiliary bulb is formed and the glass is permitted to cool, the surplus amalgam in the tube, together with any thallium oxide which may have formed at the upper end of the tube, because of contact with the atmosphere, during the sealing of the tube, is caused to flow into the auxiliary bulb until the main portion of the tube contains only sufficient amalgam to engage the upper contact wire when the thermostat is subjected to a predetermined temperature. The tube is now ready to be cut to the desired length. This is accomplished by heating the tube to a fusing temperature at the desired location above the upper contact wire and by pinching the tube to close the bore. This sealing operation provides a suitable expansion space above the said upper contact wire and thoroughly seals both sections of the tube, whereby the end of the tube containing the surplus amalgam is severed from the main portion of the tube.

One approved form of apparatus, for carrying out the several steps of the improved method, is illustrated in the accompanying drawings wherein:

Fig. 1 is a side view of the apparatus, showing the amalgam supply reservoir in section and illustrating a tube treating vessel, containing a plurality of thermostat tubes, arranged in its initial reclining position.

Fig. 2 is a similar view of the apparatus illustrating another step of the method in which the amalgam is delivered into an auxiliary chamber of the treating vessel and heat is applied to the vessel while vacuum is being drawn thereon.

Fig. 3 is a front view, partly in section and partly in elevation, of the apparatus shown in Figs. 1 and 2, but illustrating the tube treating vessel thereof moved to a vertical position.

Fig. 4 is a side view of the tube treating vessel, partly in section, representing the position of the chamber during the tube filling step of the method.

Fig. 5 illustrates one form of tube when it is filled with amalgam and before the surplus amalgam has been removed from the main body of the tube, and Fig. 6 is a view showing the thermostat tube in its finished form.

The apparatus may be described briefly as comprising a vessel 10 for containing the thermostat tubes to be filled, a frame 11 on which said vessel is pivotally supported, a storage chamber 12 for the thallium amalgam, a supply source 13 of nitrogen, and a vacuum producing device 14 (Fig. 3).

The vessel 10 of the apparatus is preferably made of glass and is in the form of a large test tube. A rubber stopper 15 closes the open upper end of the vessel and is provided with a purge valve 16 which may be opened and closed as may be desired. Near the lower end of the vessel 10, two hollow arms 17—18 communicate with the tube receiving chamber 19 of the vessel 10 and extend outwardly from opposite sides of the vessel to provide a pivotal support therefor. The said arms 17—18 rest in open loop portions 20 of a pair of supporting brackets 21 secured to a vertical back portion 22 of the frame 11. By means of the pivotal support of the vessel 10, it may be moved to a reclining position as shown in Figs. 1 and 2, in which position the upper end of the vessel is supported on an abutment portion 23 of the frame. When the vessel 10 is moved about its pivotal arms 17—18 to a vertical position, the upper end of the vessel is releasably engaged by a holding clip 24, as shown in Figs. 3 and 4 of the drawing.

The hollow arm 18 is connected, by means of a duct 26 to the vacuum pump 14. A valve 27 is interposed in the duct 26, whereby communication of the interior of the tube receiving chamber 19 with the vacuum pump 14 may be opened and closed as desired. The other hollow arm 17 terminates in an enlargement 28 which provides an auxiliary chamber 29 for receiving and temporarily retaining a quantity 30 of the thallium amalgam (Fig. 2). The said auxiliary chamber 29 is so formed that it extends from the arm 17 in a direction away from the closed end 31 and inclines downwardly relative to the longitudinal center of the vessel 10 when the latter is in the reclining position shown in Figs. 1 and 2. In this position of the vessel 10, the auxiliary chamber 29 will retain the said body 30 of amalgam. The top surface of the enlargement 28 is formed with two branch ducts 32—33. These ducts are connected, respectively, by Tygone tubing 34—35 to the amalgam storage reservoir 12 and to the source of nitrogen supply. The reservoir 12 is preferably in the form of a funnel and is supported in a ring bracket 36 secured to the portion 22 of the frame. The supply 37 of thallium amalgam is contained in the reservoir 12 under a protecting covering preferably of dilute sulphuric acid (3N—H₂SO₄) or of methyl alcohol so as to prevent contact of the amalgam with the atmosphere. The delivery of the amalgam into the auxiliary receiving chamber 29 is controlled by means of a valve 38. A valve 39 controls the delivery of nitrogen into the auxiliary chamber 29 and into the tube treating chamber 19 of the pivoted vessel 10.

The reference numeral 40 designates a device for applying heat, during one step of the method, to the vessel 10 and to the thermostat tubes therein contained to vaporize and drive off all moisture adhering to the inner wall of the vessel or to any part of the thermostat tubes. The heating element 40 is illustrated as an electrical heat lamp; this form of heating device is intended merely as illustrative, since a Bunsen burner or any other suitable heat source may be used.

The blank thermostat tubes employed in connection with the present disclosure are designated by the numeral 41 and include a glass tube, somewhat longer than the finished product, formed at one end with two bulbs 42 and 43 connected by a central communicating duct 44 of small bore. If desired, the tubes may be formed with more or less bulbs than herein shown. Consequently, the specific form of tube shown is not intended as a limitation. The contact wires 45—46, preferably of platinum, are inserted through the tube at suitable locations.

When the above apparatus is used to carry out the several steps of the improved method, the vessel 10 is first moved to its reclining position as shown in Fig. 1, and the stopper 15 is removed. The valve 39 is open so as to thoroughly flush the tube receiving chamber 19 of vessel 10 and the amalgam receiving chamber 29 with a non-oxidizing vapor, preferably nitrogen. The thermostat blank tubes 41 are inserted in the chamber 19, substantially as indicated in Fig. 1, with their open ends at the bottom of a chamber 19. The closed rounded end 31 of said chamber provides it with an inner concaved bottom surface. Consequently, the plane surfaces at the open ends of the tubes 41 will be at an angle to the concave bottom surface of the chamber and thereby insure that the central bore of the tubes 41 will remain in open communication with the interior of said chamber 19 at all times. The present disclosure indicates only two such thermostat tubes, but it will be understood that a considerably larger number of blank tubes will be ordinarily placed in the said chamber 19. After the chambers 29 and 19 are thoroughly flushed with nitrogen, the stopper 15 is inserted in the open end of the chamber 19. The purge valve 16 remains open and the supply of nitrogen is continued so as to continue the flushing operation. At this time the valve 38 is opened to deliver a quantity of amalgam through the tube 34 into the auxiliary receiving chamber 29. This body of amalgam will fill the chamber 29 to substantially line 30. The purge valve 16 is then closed and the valve 39 is also closed to shut off the supply of nitrogen. The valve 27 is then opened and a vacuum is drawn on the chambers 19, 29 and on the tubes 34 and 35 so as to remove all vapor. During this step of the method the vessel 10, auxiliary chamber 29 and the thermostat tubes contained in vessel 19 are heated to approximately 250° Fahrenheit so as to drive out all moisture that may be adhering to the blank tubes or to the inner wall of the chambers 19 and 29. Any suitable means may be employed for applying the said heat, for example an infra red heat lamp. After all nitrogen and other vapor have been withdrawn from the vessel and from the bores of the thermostat tubes contained therein (there being a substantially perfect vacuum), the vacuum valve 27 is closed and the chamber 10 is raised from its reclining position to the vertical position shown in Figs. 3 and 4. The movement of the vessel 10 to its vertical position causes the thallium amalgam to flow out of the auxiliary chamber 29 into the lower end of the tube retaining chamber 19 so as to immerse the open ends of the tubes 41. The nitrogen valve 39 is then opened slightly to admit nitrogen into the chamber 19 until its internal pressure corresponds to the external atmospheric pressure. The pressure differential between the interior of the tubes 41 and in the chamber 19 forces the amalgam upwardly into all of the thermostat tubes until they are completely filled.

After the blank tubes have been completely filled with amalgam, the stopper 15 may be removed from the vessel 10 and the tubes 41 may be individually withdrawn from the said vessel while the vessel is being flushed with nitrogen, this flushing being continued particularly to protect the surplus amalgam in the bottom of chamber 19 from contact with the atmosphere and consequent oxidation.

After each tube is withdrawn from the chamber 19 its outer end is quickly heated to a fusing temperature and is pinched closed so as to thoroughly seal the tube. The application of heat to the said end of the tube is then continued until the glass becomes more plastic and sufficient internal pressure is generated to form a bulb 47 at the end of a tube. The bulb 47 serves as an auxiliary chamber to receive the surplus amalgam contained in the tube 41. This surplus amalgam is caused to flow into the auxiliary bulb 47 until only sufficient amalgam remains in the main portion of the tube to reach the upper contact 46, when the tube is subjected to a predetermined temperature. The tube is then severed at a suitable location above the contact 46, for example at line 48. This operation is accomplished by first heating the tube to a fusing temperature so as to seal the bore, thereby seal both the upper and the lower sections of the tube. The upper section of the tube, containing the surplus amalgam, is then severed from the main tube. The finished thermostat tube, therefore, will contain thallium amalgam which is entirely free of oxides and the tube will be of substantially the proportions shown in Fig. 6, the various parts of this finished product being identified by the same reference characters used in

We claim:

1. The method of filling a thermostat tube with an oxidizable liquid while the latter is isolated from the atmosphere including the steps of placing a thermostat tube, open at one end, into an open vessel, passing a non-oxidizing flushing fluid through the interior of said vessel to flush it clear of the major portion of the atmosphere contained therein, delivering a quantity of said liquid into said vessel while it is filled with said flushing fluid and maintaining said liquid out of contact with the open end of the tube, thereafter closing the vessel and applying suction to the interior thereof to withdraw said flushing fluid together with any traces of atmosphere remaining in the vessel and tube, discontinuing the suction and thereafter causing the said liquid to immerse the open end of the tube, and then refilling the closed vessel with said flushing fluid, whereby the pressure of said flushing fluid on said liquid causes it to flow into the evacuated interior of the tube to completely fill the same.

2. The method of simultaneously filling a plurality of thermostat tubes with an oxidizable liquid while the latter is isolated from the atmosphere including the steps of placing the tubes, open at one end, into an open vessel with the open ends of the tubes facing a closed wall of the vessel, passing a non-oxidizing flushing fluid through said vessel to flush it clear of the major portion of the atmosphere contained therein, delivering a quantity of said liquid into said vessel while it is filled with said flushing fluid and maintaining said liquid out of contact with the open ends of the tubes, thereafter closing the vessel and applying suction to the interior thereof to withdraw said flushing fluid together with any traces of atmosphere remaining in the vessel and tubes, discontinuing the suction and thereafter causing the said liquid to immerse the open ends of the tubes, and then refilling the closed vessel with said flushing fluid, whereby the pressure of said flushing fluid on said liquid causes it to flow into the evacuated interior of the tubes to completely fill the same.

3. The method of simultaneously filling a plurality of thermostat tubes with thallium amalgam which includes the several steps of placing the thermostat tubes, open at one end, into an open vessel with the open ends of the tube facing the bottom of the vessel, flushing the interior of the vessel and the tubes with a quantity of nitrogen to expel the major portion of the atmosphere therefrom, delivering a quantity of said thallium amalgam into said vessel while it is filled with nitrogen so as to isolate the amalgam from contact with external atmosphere and thereby avoid oxidation of the amalgam, the said amalgam being maintained in the said vessel out of contact with the open ends of the tubes, closing the vessel and applying suction to the interior thereof to withdraw said nitrogen together with any traces of atmosphere remaining in the vessel and tubes, applying heat to the said vessel and tubes during the continuance of said suction to vaporize and drive off any moisture within the vessel and tubes, closing the vessel against further suction and thereafter causing the amalgam to immerse the open ends of the tubes within said closed vessel, and then refilling the chamber with nitrogen to establish an internal pressure in the said vessel equivalent to the external atmospheric pressure, whereby the pressure of the nitrogen on said amalgam causes it to flow into the evacuated interior of the tubes to completely fill the same.

4. The method of simultaneously filling a plurality of thermostat tubes with an oxidizable liquid while the latter is isolated from the atmosphere including the steps of placing the tubes, open at one end, into an open vessel with the open ends of the tubes facing a closed wall of the vessel but spaced therefrom to maintain the interior of the tube in open communication with the interior of the vessel, the said vessel including a main compartment in which said tubes are positioned and a laterally positioned compartment communicating therewith, passing a non-oxidizing flushing fluid through said main and lateral compartments of said vessel to flush them clear of the major portion of atmosphere contained therein, delivering a quantity of said liquid into said lateral compartment while the vessel as a whole is filled with said flushing fluid, thereafter closing the vessel and applying suction to interior thereof to withdraw said flushing fluid together with any traces of atmosphere remaining in the vessel and tubes, discontinuing said suction and turning the vessel to cause said liquid to flow into the main compartment of the vessel to immerse the open ends of the tubes, and then refilling the closed vessel with said flushing fluid, whereby the pressure of said flushing fluid on said liquid causes it to flow into the evacuated interior of the tubes to completely fill the same.

References Cited in the file of this patent

UNITED STATES PATENTS

| Number | Name | Date |
| --- | --- | --- |
| 695,271 | Besse et al. | Mar. 11, 1902 |
| 1,345,347 | Chaney | July 6, 1920 |
| 1,679,386 | Tenney | Aug. 7, 1928 |
| 1,877,726 | Noble | Sept. 13, 1932 |
| 2,047,273 | Kopinski | July 14, 1936 |
| 2,337,678 | Nowell et al. | Dec. 28, 1943 |
| 2,379,342 | Cozzoli | June 26, 1945 |
| 2,385,071 | Geier | Sept. 18, 1945 |
| 2,449,478 | Herzog | Sept. 14, 1948 |
| 2,464,765 | Palmer | Mar. 15, 1949 |